(12) United States Patent
Reddy

(10) Patent No.: US 7,021,296 B2
(45) Date of Patent: Apr. 4, 2006

(54) METHOD AND SYSTEM OF EVAPORATIVE EMISSION CONTROL USING ACTIVATED CARBON FIBERS

(75) Inventor: Sam R. Reddy, West Bloomfield, MI (US)

(73) Assignee: General Motors Corporation, Detroit, MI (US)

( * ) Notice: Subject to any disclaimer, the term of this patent is extended or adjusted under 35 U.S.C. 154(b) by 127 days.

(21) Appl. No.: 10/303,556

(22) Filed: Nov. 25, 2002

(65) Prior Publication Data
US 2004/0031469 A1 Feb. 19, 2004

Related U.S. Application Data

(60) Provisional application No. 60/404,071, filed on Aug. 16, 2002.

(51) Int. Cl.
*F02M 37/04* (2006.01)
(52) U.S. Cl. .................. 123/520; 123/198 D; 95/146
(58) Field of Classification Search .......... 95/900–903, 95/90, 146, 148; 123/518, 519, 520, 198 D; 502/416, 425, 424
See application file for complete search history.

(56) References Cited

U.S. PATENT DOCUMENTS

| | | | |
|---|---|---|---|
| 3,650,102 A | 3/1972 | Economy et al. | |
| 3,723,588 A | 3/1973 | Economy et al. | |
| 4,536,440 A * | 8/1985 | Berg | 442/346 |
| 5,393,329 A * | 2/1995 | Inagaki et al. | 96/131 |
| 6,279,548 B1 | 8/2001 | Reddy | |
| 6,540,815 B1 * | 4/2003 | Hiltzik et al. | 95/146 |
| 6,585,794 B1 * | 7/2003 | Shimoda et al. | 55/527 |
| 6,613,126 B1 * | 9/2003 | Tange et al. | 95/95 |
| 6,692,555 B1 * | 2/2004 | Oda et al. | 96/134 |

OTHER PUBLICATIONS

U.S. Appl. No. 10/151,430, "Evaporative Control System.".
K. L. Foster et al., "Adsorption Characteristics of Trace Volatile Organic Compound In Gas Streams Onto Activated Carbon Fibers," Chem. Mater., vol. 4, pp. 1068-1073 (1992).
H. Itakura et al., "Studies on Carbon Canisters to Satisfy LEVII EVAP Regulations," SAE Paper No. 2000-01-0895, (2000), pp. 1-9.
Joseph S. Hayes, Jr., "Activated Carbon Fiber Textiles for Filtration and Separation," Brochure of American Kynol, Inc., undated.
P. D. Sullivan, et al., "Adsorption and Electrothermal Desorption of Hazardous Organic Vapors," J. Environmental Eng., Mar. 2001, pp. 217-223.

* cited by examiner

*Primary Examiner*—Carl S. Miller
(74) *Attorney, Agent, or Firm*—Kathryn A. Marra

(57) ABSTRACT

An evaporative emission control system for a vehicle comprises a scrubber containing an activated carbon fiber material selected to adsorb butane and/or pentane isomer vapors in low concentrations in air passing through the scrubber and to desorb the adsorbed butane and/or pentane isomers without being heated. A method for reducing bleed emission to below about 3 mg per day uses the scrubber.

18 Claims, 3 Drawing Sheets

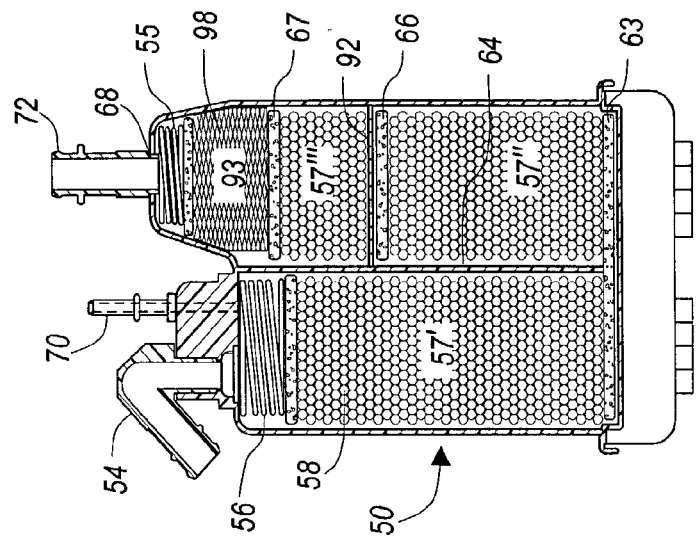
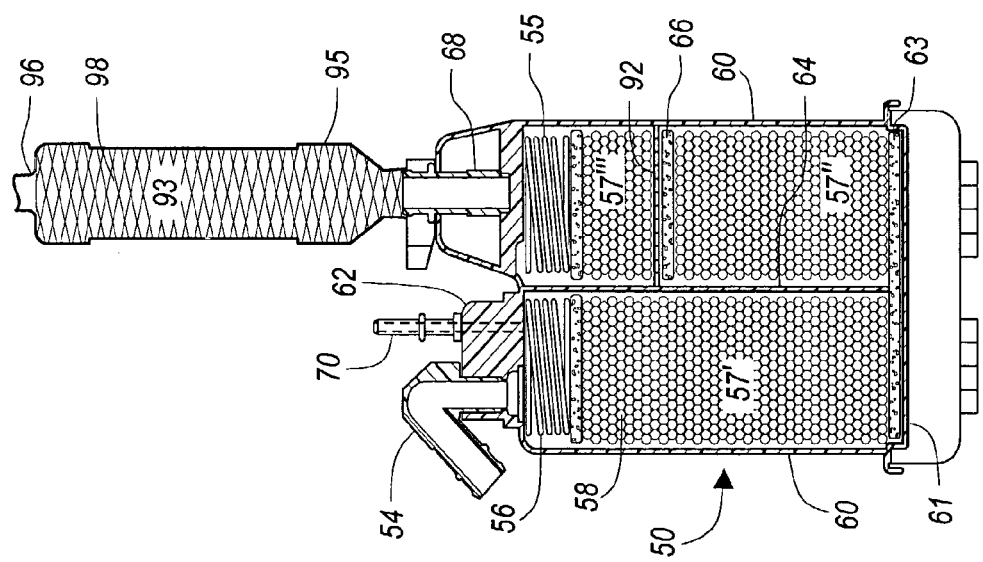

METHOD AND SYSTEM OF EVAPORATIVE EMISSION CONTROL USING ACTIVATED CARBON FIBERS

CROSS-REFERENCE TO RELATED APPLICATIONS

This application claims the benefit of U.S. Provisional Application No. 60/404,071, filed Aug. 16, 2002, which is hereby incorporated by reference.

FIELD OF THE INVENTION

The present invention relates to methods and systems for evaporative emission control for hybrid and non-hybrid vehicles, and more specifically to methods and systems for reducing and preventing vapor emissions from fuel tanks of such vehicles.

BACKGROUND OF THE INVENTION

Gasoline typically includes a mixture of hydrocarbons ranging from higher volatility butanes ($C_4$) to lower volatility $C_8$ to $C_{10}$ hydrocarbons. When vapor pressure increases in the fuel tank due to conditions such as higher ambient temperature or displacement of vapor during filling of the tank, fuel vapor flows through openings in the fuel tank. To prevent fuel vapor loss into the atmosphere, the fuel tank is vented into a canister that contains an adsorbent material such as activated carbon granules ("evap" canister).

The fuel vapor is a mixture of the gasoline vapor (referred to in this description also by its main component, hydrocarbon vapor) and air. As the fuel vapor enters an inlet of the canister, the hydrocarbon vapor is adsorbed onto activated carbon granules and the air escapes into the atmosphere. The size of the canister and the volume of the adsorbent activated carbon are selected to accommodate the expected gasoline vapor generation. After the engine is started, the control system uses engine intake vacuum to draw air through the adsorbent to desorb the fuel. The desorbed fuel vapor is directed into an air induction system of the engine as a secondary air/fuel mixture. One exemplary evaporative control system is described in U.S. Pat. No. 6,279,548 to Reddy, which is hereby incorporated by reference.

When the gasoline tank is filled, fuel vapor accumulates in the canister. The initial loading may be at the inlet end of the canister, but over time the fuel vapor is gradually distributed along the entire bed of the adsorbent material. After the engine is started, a purge valve is opened and air is drawn through the canister. The air removes fuel vapor that is stored in the adsorbent material.

One problem encountered by such a system has been vapor breakthrough, or hydrocarbon emissions from the vented vapor adsorption canister, which is often referred to as canister bleed emissions. Such emissions may be, for example, about 20 mg hydrocarbons per day. It would be desirable to substantially decrease the bleed emissions from the vapor emission control system.

SUMMARY OF THE INVENTION

An evaporative emission control system for a vehicle according to the present invention includes a fuel tank for storing a volatile fuel and an engine having an air induction system. A primary canister contains activated carbon granules as hydrocarbon adsorbent, a vapor inlet coupled to the fuel tank, a purge outlet coupled to the air induction system, and a vent/air inlet. The primary canister contains the adsorbent activated carbon granules in one or more chambers through which the fuel vapor passes between the vapor inlet and the vent/air inlet. The evaporative emission control system further includes an activated carbon fiber material, either contained in a further chamber of the primary canister, which further chamber is located between the chamber of the primary canister containing the activated carbon granules (or the last chamber containing the activated carbon granules, if there are more than one such chamber) and the vent/air inlet, or contained in a scrubber coupled to the vent/air inlet, or contained in both the further chamber of the primary canister and in the scrubber. In describing this invention, the scrubber containing the activated carbon fiber and the further chamber containing the activated carbon fiber will be termed "scrubbers," with the scrubber being a "separate scrubber" and the further chamber being a "primary canister scrubber."

The activated carbon materials adsorb fuel vapors when the engine is not running to reduce bleed emissions and desorb fuel vapors when intake vacuum draws air through the scrubber and primary canister while the engine is running. The desorption regenerates the adsorptive capacity of the activated carbons. The activated carbon fiber material is selected to adsorb butane and/or pentane isomer vapors that are in low concentrations in the air and to desorb the butane and/or pentane isomers without heat. The activated carbon fiber is capable of adsorbing such low concentrations of butane and/or pentane isomers than the activated carbon granules of the primary canister, while the activated carbon granules may be capable of adsorbing higher amounts of hydrocarbons overall, particularly when the hydrocarbons are more concentrated in the fuel vapor from the fuel tank.

In still other features, the evaporative emissions control system uses activated carbon granules that may be derived from wood and activated carbon fiber material derived from phenolic fibers, particularly novoloid fibers. In certain embodiments, the evaporative control system may reduce bleed emissions to below 3 mg/day, particularly below 2.0 mg/day.

In a further embodiment, the evaporative emissions control system uses as the activated carbon fiber an activated carbon fiber material having an average fiber diameter from about 8 to about 10 microns and having an average pore diameter of up to about 20 Angstroms.

The invention further provides a method for evaporative emission control for a fuel tank of a vehicle in which vapors from the fuel tank are first exposed to a quantity of activated carbon granules, and then any hydrocarbon vapors not adsorbed by the activated carbon granules ("bleed emissions") are exposed to an activated carbon fiber material capable of adsorbing substantially all of the butane and pentane isomer contained in low concentrations in the air of the bleed emissions so that emissions from the fuel tank are reduced to less than about 3 mg per day. The activated carbon fiber material can desorb the adsorbed hydrocarbons when purged with air without being heated.

The invention further provides an evaporative emission control system for a vehicle in which evaporative emissions from the fuel tank first pass through activated carbon granules and then through activated carbon fiber material. The activated carbon granules adsorb higher concentrations of fuel vapor, while the carbon fiber material adsorbs the bleed emissions that are mainly butanes and pentanes, typically at very low concentrations (1 to 10,000 parts per million by volume in air).

"About" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art through this ordinary meaning, then "about" as used herein indicates a possible variation of up to 5% in the value.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 2 is a cross sectional view of a primary canister with three chambers containing activated carbon granules and a separate scrubber containing activated carbon fiber material according to the present invention;

FIG. 3 is a cross sectional view of a primary canister with three chambers containing activated carbon granules and a primary canister scrubber containing activated carbon fiber material according to the present invention;

DETAILED DESCRIPTION OF THE PREFERRED EMBODIMENTS

The following description of the preferred embodiment(s) is merely exemplary in nature and is in no way intended to limit the invention, its application, or uses.

Figure 1:
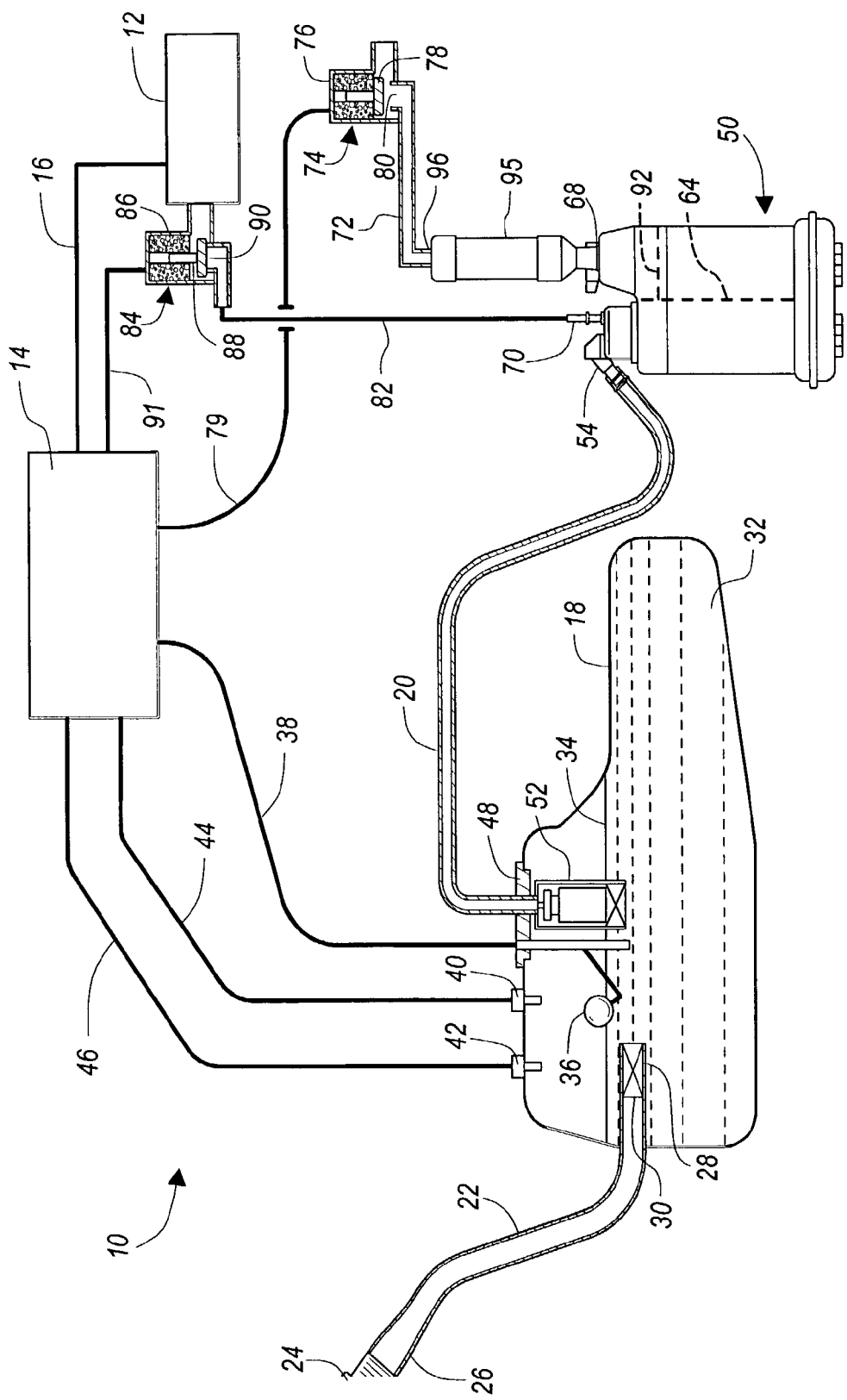
FIG. 1 is a functional block diagram of an evaporative control system for a vehicle having a primary canister and a separate scrubber.

Referring now to FIGS. 1 and 2, an evaporative control system 10 for a vehicle including an engine 12 is illustrated. The vehicle may be a conventional, non-hybrid vehicle or a hybrid vehicle that includes both an internal combustion engine and an electric motor (not shown). The engine 12 is preferably an internal combustion engine that is controlled by a controller 14. The engine 12 typically burns gasoline, ethanol, and other volatile hydrocarbon-based fuels. The controller 14 may be a separate controller or may form part of an engine control module (ECM), a powertrain control module (PCM) or any other vehicle controller.

When the engine 12 is started, the controller 14 receives signals from one or more engine sensors, transmission control devices, and/or emissions control devices. Line 16 from the engine 12 to the controller 14 schematically depicts the flow of sensor signals. During engine operation, gasoline is delivered from a fuel tank 18 by a fuel pump (not shown) through a fuel line (not shown) to a fuel rail. Fuel injectors inject gasoline into cylinders of the engine 12 or to ports that supply groups of cylinders. The timing and operation of the fuel injectors and the amount of fuel injected are managed by the controller 14.

The fuel tank 18 is typically a closed container except for a vent line 20. The fuel tank 18 is often made of blow molded, high density polyethylene provided with one or more gasoline impermeable interior layer(s). The fuel tank 18 is connected to a fill tube 22. A gas cap 24 closes a gas fill end 26 of the fill tube 22. The outlet end 28 of the fill tube 22 is located inside of the fuel tank 18. A one-way valve 30 prevents gasoline 32 from splashing out of the fill tube 22. An upper surface of the gasoline is identified at 34. A float-type fuel level indicator 36 provides a fuel level signal at 38 to the controller 14. A pressure sensor 40 and a temperature sensor 42 optionally provide pressure and temperature signals 44 and 46 to the controller 14.

The fuel tank 18 includes a vent line 20 that extends from a seal 48 on the fuel tank 18 to a primary canister 50. A float valve 52 within the fuel tank 18 prevents liquid gasoline from entering the vapor vent line 20. Fuel vapor pressure increases as the temperature of the gasoline increases. Vapor flows under pressure through the vent line 20 to the vapor inlet of the primary canister 50. The vapor enters canister vapor inlet 54, flows past a retainer element 56 as shown in the figures, and diffuses into chambers containing activated carbon granules 58. Retainer element 56 is shown as a spring pressing against a porous pad that allows the vapor to pass through to the chambers.

The primary canister 50 is formed of any suitable material. For example, molded thermoplastic polymers such as nylon are typically used. The primary canister 50 includes side walls 60, a bottom 61, and a top 62 that define an internal volume. A vertical internal wall 64 extends downwardly from the top 62. A vent opening 68 at the top 62 serves as an inlet for the flow of air past a retainer element 55, shown as comprising a porous, spring loaded element as was retainer element 56, during purging of adsorbed fuel vapor from the activated carbon granules 58. The retaining element 55 may also be located at the bottom of the chamber of activated carbon granules 58, or at both bottom and top. A purge outlet 70 is also formed in the top 62. A stream of purge air and fuel vapor exit the canister through the purge outlet 70.

A scrubber 95 containing activated carbon fiber material is coupled to vent opening 68. The scrubber may be made of any suitable material, such as molded thermoplastic polymers such as nylon or polycarbonate. Air leaving the primary canister flows through the scrubber. The activated carbon fiber material adsorbs emissions contained in the air, particularly low concentrations of lower molecular weight hydrocarbons such as isomers of butane and/or pentane. At the other end from the primary canister, scrubber 95 is connected through vent opening 96 to a vent line 72 and solenoid actuated vent valve 74. The vent valve 74 is normally open as shown. A solenoid 76 moves a stopper 78 to cover the vent opening 80. The solenoid 76 is actuated by the controller 14 through a signal lead 79. The vent valve 74 is usually closed for diagnostic purposes only.

The purge outlet 70 is connected by a purge line 82 through a solenoid actuated purge valve 84 to the engine 12. The purge valve 84 includes a solenoid 86 and a stopper 88 that selectively close an opening 90. Purge valve 84 is operated by the controller 14 through a signal lead 91 when the engine 12 is running and can accommodate a secondary air/fuel mixture.

As an air/fuel mixture flows from the fuel tank 18 through the vent line 20 and the inlet 54 into the primary canister 50, hydrocarbons from the vapor are adsorbed by the activated carbon granules 58 in the primary canister 50. FIGS. 1 and 2 show a primary canister containing three separate chambers of activated carbon granules defined by walls 64 and 92, the chambers containing volumes 57', 57", and 57'" of activated carbon granules. Wall 64 extends to a layer 63 of porous material that contains the activated carbon granules but allows the vapor to flow from one chamber to the next. Wall 92 is porous to allow vapor to pass through and is shown together with a layer 66 of porous material. Layers 63 and 66 may be, for example, foam plastic pads that are porous to the vapor while retaining the activated carbon granules in their respective chambers. Wall 92 may be made of a stiffer material, for example a steel mesh or a plastic screen. The vapor passes through all chambers of the activated carbon granules 58, with the air exiting through the vent opening 68. Lower molecular weight hydrocarbons, such as butanes and pentanes, due to being smaller in size and more volatile, may be lost as bleed emissions. The air and bleed emissions exiting through vent opening 68 pass through the separate scrubber 95 containing a volume 93 of an activated carbon fiber material 98, where the bleed emissions are adsorbed by activated carbon fiber material 98.

When the engine is operating, the controller 14 opens the purge valve 84 to allow air to be drawn past the vent valve 74. The air flows through the vent line 72, separate scrubber 95, and into the vent opening inlet 68. The air is drawn through the evap canister. In other words, air flows through the activated carbon fiber material and the activated carbon granules. The air becomes laden with desorbed hydrocarbons and exits through the purge outlet 70. The adsorbed hydrocarbons are desorbed from the activated carbon fiber material without heating. The fuel-laden air is drawn through the purge line 82 and the purge valve 84 into the engine 12.

One suitable example of the activated carbon granules is wood based activated carbon granules. For example, Westvaco wood carbon NUCHAR BAX-1500 is commercially available. Other activated carbon granules that are currently used in conventional canisters are also contemplated.

The bleed emissions from the primary canister primarily consist of butane and pentane isomers at very low concentrations, including butane, pentane, isobutane, and isopentane. The present invention utilizes an activated carbon fiber material in the scrubber that is particularly suited to adsorb these light hydrocarbons at very low concentrations. The activated carbon granules that are typically used in current production canisters are not suitable for adsorbing these light hydrocarbons because, while the activated carbon granules may be able to adsorb an overall higher amount of hydrocarbons, they are not as able to adsorb small-molecule hydrocarbons, such as the butane and pentane vapors of bleed emissions, or to efficiently adsorb such vapors at the low concentrations of bleed emissions. The activated carbon fiber material preferably has an average pore diameter of about 20 Angstroms or less. Substantially all of the pores should have diameters of about 25 Angstroms or less, and preferably virtually all of the pores have a pore diameter of about 22 Angstroms or less. In one embodiment, the activated carbon of the second adsorbent has predominantly, preferably substantially entirely, pore diameters of from 14 to 22 Angstroms. While higher pore diameters are generally thought to have greater capacity for adsorbing materials, pore diameters higher than about 25 Angstroms do not efficiently adsorb the butane and pentane isomers of bleed emissions.

The scrubber preferably contains about 5 to about 10 grams, preferably, from about 6 to about 10 grams of activated carbon fiber, and more preferably from about 7 to about 10 grams of activated carbon fiber material, in suitable form. A hybrid vehicle preferably uses from about 6 to about 10 grams of the activated carbon fiber, more preferably from about 8 to about 10 grams of the activated carbon fiber. The activated carbon fiber material may be employed in different forms, including, without limitation, rovings, yarns, and chopped fibers, and other forms derived from fibers, including felts, papers, and woven and nonwoven fabrics. The form or combinations of forms of the fiber material are selected to prevent excessive pressure drops that would affect the engine or evaporative emission control system performance.

In another embodiment, the activated carbon fiber is derived from phenolic fibers, preferably novoloid fibers. The term "novoloid" designates fibers having a content of at least 85 weight percent of a crosslinked novolac. In general, phenolic resins are prepared by reaction of phenol or substituted phenols with an aldehyde, especially formaldehyde, although other aldehydes, such as acetaldehyde or crotonaldehyde, may be used or used in mixture with formaldehyde. The reaction is generally carried out with an acidic or basic catalyst. The phenolic resin is formed into a fiber. Novoloid fibers may be prepared by acid-catalyzed crosslinking of meltspun novolac resins in aqueous formaldehyde to produce crosslinked, amorphous network. Preferred processes for manufacturing novoloid fibers are disclosed in Economy et al, U.S. Pat. Nos. 3,650,102 and 3,723,588, both of which are entirely incorporated herein by reference. Other suitable crosslinkers include polyamines crosslinkers.

The preferred novoloid fibers may be in any form desired, including continuous fibers, chopped fibers, fibers carded to produce a fluffy web or wool, a fluffy web needled to obtain a felt, or fibers twisted into a roving, formed into a yarn, woven into a cloth, or formed into a paper with a binder such as a cellulosic material. The novoloid fibers are carbonized and activated to produce activated carbon forms. In a representative method, the fibers may be pyrolyzed at about 800–1000° C. in the presence of an "activating" gas such as carbon dioxide or water vapor, or in an inert atmosphere (e.g., in nitrogen) followed by a later activating step to produce the activated carbon form. The activation is carried out for a time necessary to obtain the desired pore radius. The pore diameter should be large enough to accommodate the molecules of the hydrocarbon molecules of the bleed emissions.

The activated carbon fibers preferably have a diameter of from about 8 to about 10 microns. A sheet form such as a felt, cloth, or paper may be pleated. Activated carbon fibers derived from novoloid fibers are commercially available from Nippon Kynol and American Kynol (Pleasantville, N.Y.). One commercial example is Kynol activated carbon fiber ACF-1603-15.

In a preferred embodiment, the activated carbon fibers are in the form of chopped fibers and/or fluffy web. In another preferred embodiment, the activated carbon fibers are in the form of a sheet, which may preferably be pleated to reduce pressure drop when refueling vapor flows through the canister. The scrubber may contain more than one form of the second activated carbon fibers to both reduce the pressure drop and minimize the cost of the activated carbon fiber material used.

Referring now to FIG. 3, the present invention may include as a primary canister 50 with a primary canister scrubber as further chamber having volume 93 of an activated carbon fiber material 98. Retainer element 55 holds the carbon fiber material in place. An air/fuel mixture flows through three chambers defined by walls 64 and 92 having volumes 57', 57", and 57'" of activated carbon granules 58 as in FIGS. 1 and 2, where hydrocarbons from the vapor are adsorbed by the activated carbon granules 58. Wall 64 extends to a layer 63 of porous material that contains the activated carbon granules but allows the vapor to circulate from one chamber to the next. Layer 66 of porous material may again be located at wall 92. The vapor passes through all chambers of the activated carbon granules 58 and then passes through volume 93 of an activated carbon fiber material 98 where bleed emissions, principally low concentrations of butane(s) and/or pentane(s) are adsorbed from the air, with the air exiting through the vent opening 68 into vent line 72. A layer 67 of porous material separates volume 93 of the activated carbon fiber material 98 from the final chamber of activated carbon granules. The primary canister has vapor inlet 54, retainer element 56, and purge outlet 70 as in the embodiment of FIGS. 1 and 2. Retainer element 56, here shown as a spring loaded element, may alternatively be located at the bottom of the chamber or at both bottom and top, as was the case with retainer element 55.

Figure 4:
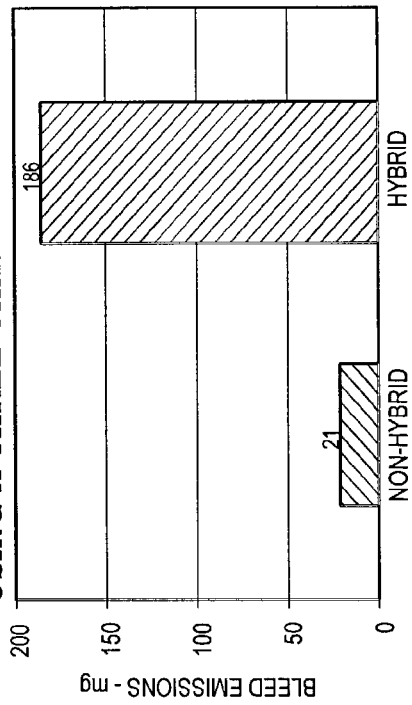
FIG. 4 is a bar chart illustrating typical daily bleed emissions of a primary canister without a scrubber for non-hybrid and hybrid vehicles.
Figure 6:
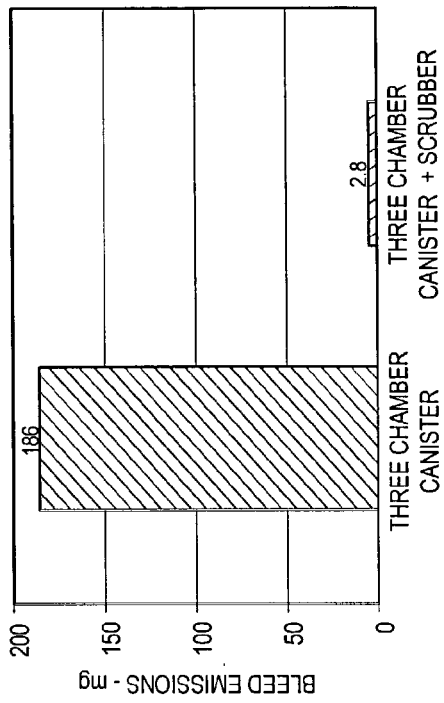
FIG. 6 is a bar chart comparing bleed emissions from a primary canister without a scrubber and with a scrubber for a hybrid vehicle.
Figure 5:
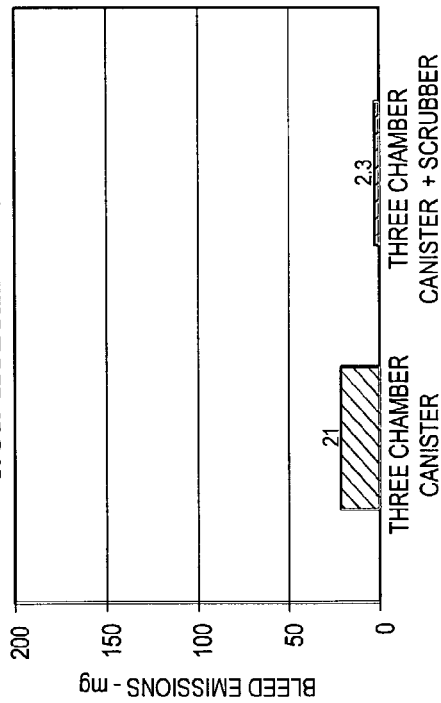
FIG. 5 is a bar chart comparing bleed emissions from a primary canister without a scrubber and with a scrubber for a non-hybrid vehicle.

Referring now to FIG. 4, it can be seen that a hybrid engine typically produces more bleed emissions than a non-hybrid engine. Hybrid vehicles combine a gasoline fueled internal combustion (IC) engine and an electric motor to provide a hybrid powertrain with improved fuel economy. Frequent on-off engine operation results in much smaller canister purge air volume. Because the IC engine does not operate nearly 50% of the time, canister purging with fresh air occurs less than 50% of the time during vehicle operation. The bar chart of FIG. 4 shows a non-hybrid engine using a three-chamber prior art evap canister, such as the primary canister of FIGS. 1 and 2 without the scrubber, producing 21 mg hydrocarbon emissions per day, compared to a hybrid engine using the same three-chamber prior art evap canister producing 186 mg hydrocarbon emissions per day. FIG. 5 illustrates a typical reduction in bleed emissions for a non-hybrid engine using a scrubber containing activated carbon fiber according to the invention. The non-hybrid engine equipped with a three-chamber prior art evap canister produced 21 mg hydrocarbon emissions per day. When a scrubber containing about 7 grams of activated carbon fiber (Kynol activated carbon fiber ACF-1603-15) was added to the three-chamber evap canister, hydrocarbon emissions were reduced to 2.3 mg per day (about one-tenth of the original amount of emissions). FIG. 6 illustrates an even more dynamic reduction in bleed emissions for a hybrid engine when a scrubber was added. With a three-chamber prior art evap canister, the hybrid engine produced 186 mg hydrocarbon emissions per day. When a scrubber containing about 7 grams of activated carbon fiber (Kynol activated carbon fiber ACF-1603-15) was added to the three-chamber evap canister, hydrocarbon emissions were reduced to 2.8 mg per day (about 1.5% of the original amount of emissions).

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. An evaporative emission control system for a vehicle, comprising
    a primary canister comprising activated carbon granules as hydrocarbon adsorbent and, downstream of the activated carbon granules
    a scrubber containing an activated carbon fiber material selected to adsorb butane and/or pentane isomer vapors in low concentrations in air passing through the scrubber and to desorb the adsorbed butane and/or pentane isomer vapors without heat, wherein the activated carbon fiber material has an average fiber diameter of from about 8 to about 10 microns and has an average pore diameter of up to about 20 Angstroms,
    wherein the activated carbon granules are capable of absorbing higher amounts of hydrocarbon vapor from exhaust air than the activated carbon fiber material and the activated carbon fiber material is capable of adsorbing higher amounts of butane and/or pentane isomer vapors in low concentrations from the air than the activated carbon granules.

2. An evaporative emission control system for a vehicle according to claim 1, wherein the activated carbon fiber material is derived from novoloid fiber material.

3. An evaporative emission control system for a vehicle according to claim 1, wherein said evaporative emissions system has bleed emissions below 3 mg/day.

4. An evaporative emission control system for a vehicle according to claim 1, wherein the activated carbon fiber material comprises activated carbon fibers in a form selected from the group consisting of pleated sheets, chopped fibers, fluffy webs, and combinations thereof.

5. An evaporative emission control system for a vehicle, comprising:
    a fuel tank for storing a volatile fuel;
    a canister having one or more chambers containing activated carbon granules, said canister having a vapor inlet coupled with the fuel tank, a purge inlet coupled to an air induction inlet for an engine, and an air inlet, wherein said one or more chambers are located between the vapor inlet and the air inlet; and
    a scrubber containing activated carbon fiber material, said scrubber being either a further chamber of the canister located between a last chamber containing activated carbon granules and the air inlet or a separate canister coupled to said air inlet,
    wherein said activated carbon fiber material has an average fiber diameter of from 8 to 10 microns and pore diameters predominantly from 14 to 22 Angstroms,
    wherein the activated carbon granules are capable of absorbing higher amounts of hydrocarbon vapor from exhaust air than the activated carbon fiber material and the activated carbon fiber material is capable of adsorbing higher amounts of butane and/or pentane isomer vapors in low concentrations from the air than the activated carbon granules.

6. An evaporative emission control system for a vehicle according to claim 5, wherein the activated carbon fiber material is derived from novoloid fiber material.

7. An evaporative emission control system for a vehicle according to claim 5, wherein said evaporative emissions system has bleed emissions below 3 mg/day.

8. The evaporative emissions system of claim 5 wherein said evaporative emissions system reduces bleed emissions below 2.0 mg/day.

9. An evaporative emission control system for a vehicle according to claim 5, wherein the activated carbon fiber material comprises activated carbon fibers in a form selected from the group consisting of pleated sheets, chopped fibers, fluffy webs, and combinations thereof.

10. An evaporative emission control system for a vehicle according to claim 5, wherein said engine is integrated with a hybrid engine.

11. A method for reducing bleed emissions from an evaporative emission control system for a vehicle, comprising venting the evaporative emission control system to a scrubber containing an activated carbon fiber material capable of adsorbing butane and/or pentane isomer vapors in low concentrations in air and capable of desorbing the adsorbed butane and/or pentane isomers without being heated, wherein the activated carbon fiber material has an average fiber diameter of from about 8 to about 10 microns and has an average pore diameter of up to about 20 Angstroms,
wherein the activated carbon fiber material is capable of adsorbing higher amounts of butane and/or pentane isomer vapors in low concentrations from air than an adsorbent in the emission control system located before venting the evaporative emission control system to the scrubber.

12. A method according to claim 11, wherein the activated carbon fiber material is derived from novoloid fiber material.

13. A method according to claim 11, wherein said method reduces bleed emissions below 3 mg/day.

14. A method according to claim 11, wherein the activated carbon fiber material comprises activated carbon fibers in a form selected from the group consisting of pleated sheets, chopped fibers, fluffy webs, and combinations thereof.

15. A method for reducing emissions from a vehicle having a fuel tank, comprising steps of:
passing fuel/air vapor from the fuel tank first through a quantity of activated carbon granules and then through a quantity of an activated carbon fiber material, wherein the activated carbon fiber material has an average fiber diameter of from 8 to 10 microns and a pore diameter of about 25 Angstroms or less,
wherein said quantity of activated carbon granules is capable of adsorbing a desired amount of fuel vapor,
and further wherein said quantity of activated carbon fiber material is capable of adsorbing butane and pentane isomer vapor contained in concentrations of less than 10,000 parts per million by volume in air so that emissions from the fuel tank are reduced to less than about 3 mg per day,
wherein the activated carbon granules are capable of adsorbing higher amounts of hydrocarbon vapor from exhaust air than the activated carbon fiber material and the activated carbon fiber material is capable of adsorbing higher amounts of butane and/or pentane isomer vapors in low concentrations from the air than the activated carbon granules.

16. The method according to claim 15, wherein the activated carbon fiber material is capable of desorbing the adsorbed hydrocarbons without being heated when purged with air.

17. A method according to claim 15, wherein substantially all of the pores of the activated carbon fiber material have a pore diameter in the range from 14 to 22 Angstroms.

18. A method according to claim 15, wherein the quantity of activated carbon fiber material is from about 6 to about 10 grams.

* * * * *